US006471799B1

(12) United States Patent
Sasaki et al.

(10) Patent No.: US 6,471,799 B1
(45) Date of Patent: Oct. 29, 2002

(54) METHOD AND DEVICE FOR PRODUCING GYPSUM BOARDS

(75) Inventors: Kunitoshi Sasaki, Kitakyusyu; Mikiyoshi Simojima, Imabari; Shouichi Endo, Niigata; Shinji Yonezawa, Kitakyusyu, all of (JP)

(73) Assignee: Yoshino Gypsum Co., Ltd., Tokyo (JP)

( * ) Notice: Subject to any disclaimer, the term of this patent is extended or adjusted under 35 U.S.C. 154(b) by 0 days.

(21) Appl. No.: 09/623,513

(22) PCT Filed: Jun. 28, 1999

(86) PCT No.: PCT/JP99/03450

§ 371 (c)(1), (2), (4) Date: Dec. 6, 2000

(87) PCT Pub. No.: WO00/12277

PCT Pub. Date: Mar. 9, 2000

(30) Foreign Application Priority Data

Aug. 28, 1998 (JP) .......................................... 10-243980

(51) Int. Cl.[7] ............................................... B32B 13/08

(52) U.S. Cl. ........................ 156/39; 156/64; 156/273.9; 156/346; 156/378

(58) Field of Search ............................. 156/39, 44, 64, 156/273.9, 346, 378, 358

(56) References Cited

U.S. PATENT DOCUMENTS 1,489,693 A * 4/1924 Brookby ...................... 156/39
1,610,627 A * 12/1926 Spires ......................... 156/39
4,224,824 A * 9/1980 Giusti ......................... 73/159
4,477,300 A * 10/1984 Pilgrim ....................... 156/44
4,626,389 A * 12/1986 Lempfer et al. ........... 264/40.7
4,842,786 A * 6/1989 Betzner ..................... 264/40.1
5,997,779 A * 12/1999 Potter .......................... 156/39

* cited by examiner

*Primary Examiner*—Michael W. Ball
*Assistant Examiner*—Todd J. Kilkenny
(74) *Attorney, Agent, or Firm*—Oblon, Spivak, McClelland, Maier & Neustadt, P.C.

(57) ABSTRACT

Provided are a process and an apparatus for producing gypsum boards, both of which feature minimized occurrence of defective products and especially excellent continuous productivity and superb efficiency. Making use of the facts that lining paper sheets for gypsum boards are insulators and a gypsum slurry held between the lining paper sheets is a good electrical conductor, a detection of an electric current flowing between an upper forming unit and a lower forming unit or a like method makes it possible to promptly detect any localized tearing which may occur in the overlay paper and/or underlay paper due to an undesired object or the like mixed in during continuous production of gypsum boards and moreover, to readily remove the undesired object or the like as a cause for the tearing without stopping the production of gypsum boards while preventing the localized tearing from spreading over the entire width of the paper. The production process and apparatus, therefore, permit stable and continuous production of gypsum boards.

6 Claims, 4 Drawing Sheets

PRIOR ART

METHOD AND DEVICE FOR PRODUCING GYPSUM BOARDS

BACKGROUND OF THE INVENTION

1. Field of the Invention

This invention relates to a process for producing gypsum boards and also to an apparatus for producing gypsum boards.

2. Discussion of the Background

Gypsum boards have a plate-like structure with a gypsum rock core covered on its upper and lower surfaces and preferably, its left and right side surfaces by sheets of lining paper for gypsum boards, and are extensively used as a building material. Such gypsum boards are produced by holding a gypsum slurry at upper and lower surfaces thereof with an overlay paper and an underlay paper, respectively, and then causing a resulting preform to travel between upper and lower forming units while pressing the preform with the upper forming unit. As the upper forming unit and lower forming unit, forming plates and plates are used. Using forming rolls and/or plates in combination, gypsum boards are produced as a through process, for example, by a gypsum board forming apparatus 15 shown in FIG. 5.

A description will specifically be made with reference to FIG. 5. To cover an upper surface and lower surface of a gypsum rock core, respectively, an overlay paper 1, the direction of which has been changed by a roller 4, and an underlay paper 2 are continuously fed from a right side as viewed in the drawing. A gypsum slurry 3, which has a predetermined viscosity, is fed onto the underlay paper 2, and is adjusted to a predetermined thickness by the roller 4. Between an upper plate 5 and a lower plate 6, a green gypsum board which has a predetermined thickness and is planer is formed under a pressure from the upper plate 5. The green gypsum board is then caused to travel leftwards by a belt conveyor (not shown) arranged on a left side as viewed in the drawing. After that, the green gypsum board is processed or treated through steps such as drying, a gypsum board is produced as a final product. Incidentally, in FIG. 5, a predetermined forming platen which serves to support the underlay paper 2 is generally arranged on a right side of the lower plate 6, and the underlay paper 2 is allowed to slide on the forming platen and to move leftwards.

When gypsum boards are produced by such process and apparatus, catching of an undesired object for a certain cause, such as a lump of gypsum in the gypsum slurry, between the upper plate 5 and the lower plate 6 causes a problem that, as the gypsum board advances, the overlay paper 1 or underlay paper 2 is caused to progressively tear due to the undesired object. If the overlay paper 1, the underlay paper 2 and the gypsum slurry 3 are continuously fed while leaving such a tear as is, the paper continues to tear so that the production of defective products continues. This eventually leads to a problem in that the paper is torn off and the continuous operation for the production of gypsum boards cannot be continued any longer.

If an undesired object is caught between the upper plate 5 and the lower plate 6 in during production of gypsum boards and the overlay paper 1 and/or underlay paper 2 tears, it is therefore necessary to immediately stop the producing operation, to remove the undesired object, to insert fresh papers or a fresh paper between the upper plate 5 and the lower plate 6, and then to feed the gypsum slurry 3 to resume the operation. As is readily appreciated from the foregoing, tearing of the overlay paper 1 and/or underlay paper 2 during production leads to a substantial reduction in the continuous productivity of gypsum boards. It has hence been desired to develop an efficient method for making it possible to promptly discover tearing of the overlay paper 1 and/or underlay paper 2 and further to cope with the tearing.

SUMMARY OF THE INVENTION

An object of the present invention is, therefore, to provide a process for producing gypsum boards, which, if an overlay paper and/or an underlay paper locally tears due to a mixed undesired object during continuous production of gypsum boards, promptly discovers the tearing, thereby preventing the localized tearing from developing into such a tear as extending over the entire width of the paper and hence, permitting efficient production of gypsum boards without stopping the production. Another object of the present invention is to provide an apparatus for producing gypsum boards, which can effectively practice this production process of gypsum boards.

To achieve the above-described objects, the present invention provides a process for producing gypsum boards by holding a gypsum slurry at upper and lower surfaces thereof with an overlay paper and an underlay paper, respectively, and then causing a resulting preform to travel between upper and lower forming units, which are composed in combination of plates and/or forming rolls as an upper forming unit and a lower forming unit, while pressing the preform with the upper forming unit, which comprises: forming an electric circuit at least one of between the upper forming unit and the lower forming unit, between a part of the overlay paper, said part being located in an advancing direction of the production of the gypsum boards as viewed from the upper forming unit, and the upper forming unit, and between a part of the underlay paper, said part being located in the advancing direction of the production of the gypsum boards as viewed from the lower forming unit, and the lower forming unit, applying a voltage across the electric circuit, widening a spacing between the upper forming unit and the lower forming unit when a current has flowed through the electric circuit during production of the gypsum boards, and subsequent to elimination of a cause for the flow of the current, narrowing the widened spacing back to the spacing before the widening.

The present invention also provides an apparatus for producing gypsum boards by holding a gypsum slurry at upper and lower surfaces thereof with an overlay paper and an underlay paper, respectively, and then causing a resulting preform to travel between upper and lower forming units, which are composed in combination of plates and/or forming rolls as an upper forming unit and a lower forming unit, while pressing the preform with the upper forming unit, which comprises: an electric circuit formed at least one of between the upper forming unit and the lower forming unit, between a part of the overlay paper, said part being located in an advancing direction of the production of the gypsum boards as viewed from the forming unit, and the upper forming unit, and between a part of the underlay paper, said part being located in the advancing direction of the production of the gypsum boards as viewed from the lower forming unit, and the lower forming unit; a current detector for detecting flowing of a current through the electric circuit and outputting a detection signal; and a device for widening, responsive to the detection signal, a spacing between the upper forming unit and the lower forming unit and after an elapse of a predetermined time, narrowing the widened spacing back to the spacing before the widening.

BEST MODES FOR CARRYING OUT THE INVENTION

Figure 1:
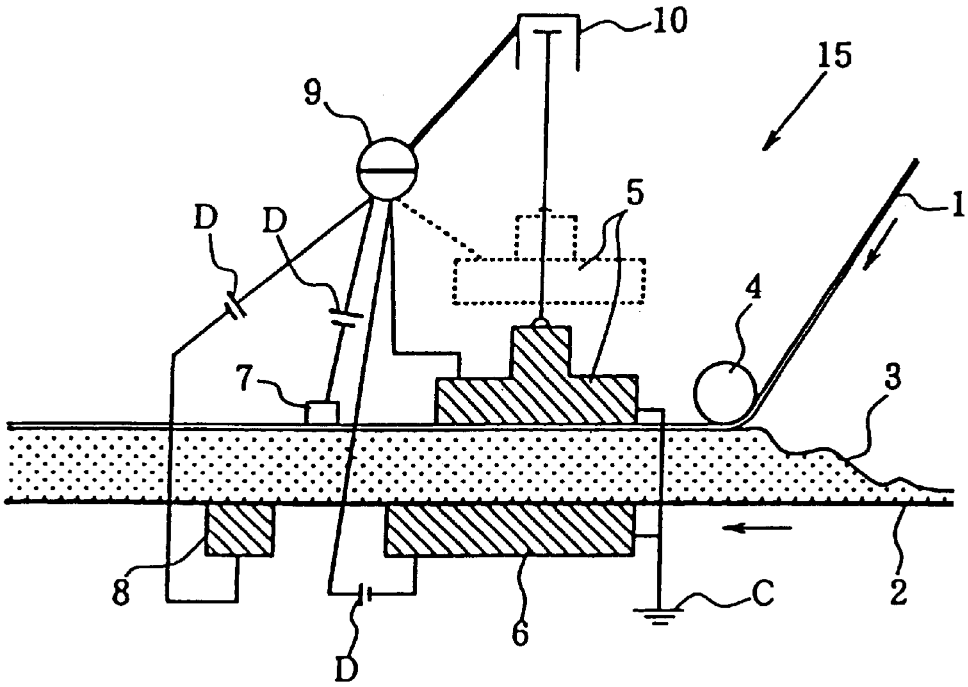
FIG. 1 is a schematic diagram of a gypsum board production apparatus according to an embodiment of the present invention.

The present invention will next be illustrated more specifically by describing its preferred embodiments.

Lining paper for gypsum boards is generally composed of three layers, that is, a surface layer, a middle layer and an adhesive layer, and a sizing agent which controls the absorption of water in paper is incorporated in the middle layer or in the surface layer and middle layer. Shortly after a gypsum slurry is covered, the water in the gypsum slurry, therefore, has not penetrated to the surface layer of the lining paper so that the lining paper is still an insulator. The present invention has been completed by taking a hint from the facts that shortly after the coverage of the gypsum slurry, the gypsum slurry is a good electrical conductor and the lining paper for gypsum boards is a good insulator, as described above. Described specifically, the present invention has been completed based on a finding that, when a flow of electricity between the upper forming unit and the lower forming unit, a flow of electricity between a part of the overlay paper, said part being located in an advancing direction of the production of the gypsum boards as viewed from the forming unit, and the upper forming unit, or a flow of electricity between a part of the underlay paper, said part being located in the advancing direction of the production of the gypsum boards as viewed from the lower forming unit, and the lower forming unit is measured, tearing (breakage) of the overlay paper and/or the underlay paper can be detected from flowing of electricity due to existence of the gypsum slurry as a good electric conductor between the overlay paper and the underlay paper; and also on a finding that a measurement of such a flow of electricity can readily and promptly detect localized tearing of the overlay paper and/or underlay paper occurred by a cause such as an undesired object mixed in during continuous production of gypsum boards.

In the process and apparatus of the present invention for the production of gypsum boards, said process and apparatus having the above-described features, an upper plate or an upper forming roll can be used as the upper forming unit while a lower plate or a lower forming roll can be employed as the lower forming unit. Examples of the combination of the upper forming unit and the lower forming unit can include plate-plate, plate-forming roll, forming roll plate and forming roll-forming roll combinations.

An embodiment which makes use of forming rolls as the upper forming unit and the lower forming unit can detect tearing of the overlay paper and/or underlay paper by a method different from the above-described method.

In a process or apparatus for producing gypsum boards by holding a gypsum slurry at upper and lower surfaces thereof with an overlay paper and an underlay paper, respectively, and then causing a resulting preform to travel between an upper forming roll and a lower forming roll or between an upper forming roll or a lower plate while pressing the preform with the upper forming roll, it is effective to form at least one electric circuit between the upper forming roll or lower forming roll and an electrode arranged adjacent to the lower forming roll or forming roll lower plate with a space left therebetween, applying a voltage across said electric circuit, widening a spacing between said upper forming roll and said lower forming roll or said lower plate when a current has flowed through said electric circuit during production of said gypsum boards, and subsequent to elimination of a cause for the flow of the current, narrowing the widened spacing back to the spacing before the widening.

EXAMPLES

Examples of the present invention will next be described with reference to the drawings.

Example 1

FIG. 1 shows, by way of example, a schematic view of an apparatus according to the present invention for the production of gypsum boards.

In the diagram, numeral 15 indicates the apparatus for the production of gypsum boards, in which an overlay paper 1 and an underlay paper 2 are travelling in a right-to-left direction as viewed in the diagram, and a gypsum slurry 3 is continuously fed onto the underlay paper 2. A roller 4 is a roller for changing the traveling direction of the overlay paper 1. An upper plate 5 is connected to an air cylinder 10. The air cylinder 10 is an example of a device which responsive to a detection signal from a current detector 9, widens a spacing between the upper plate 5 and a lower plate 6. Any device, for example, an oil cylinder or a like device can be used in place of the air cylinder 10 insofar as it can lift the upper plate 5 and can subsequently lower it to the original position as needed. In the diagram, the air cylinder 10 is actuated by the current detector 9. Any means can be used for this purpose insofar as it can directly transmit an increase in current at the current detector 9 to the device (for example, the air cylinder 10).

Figure 4:
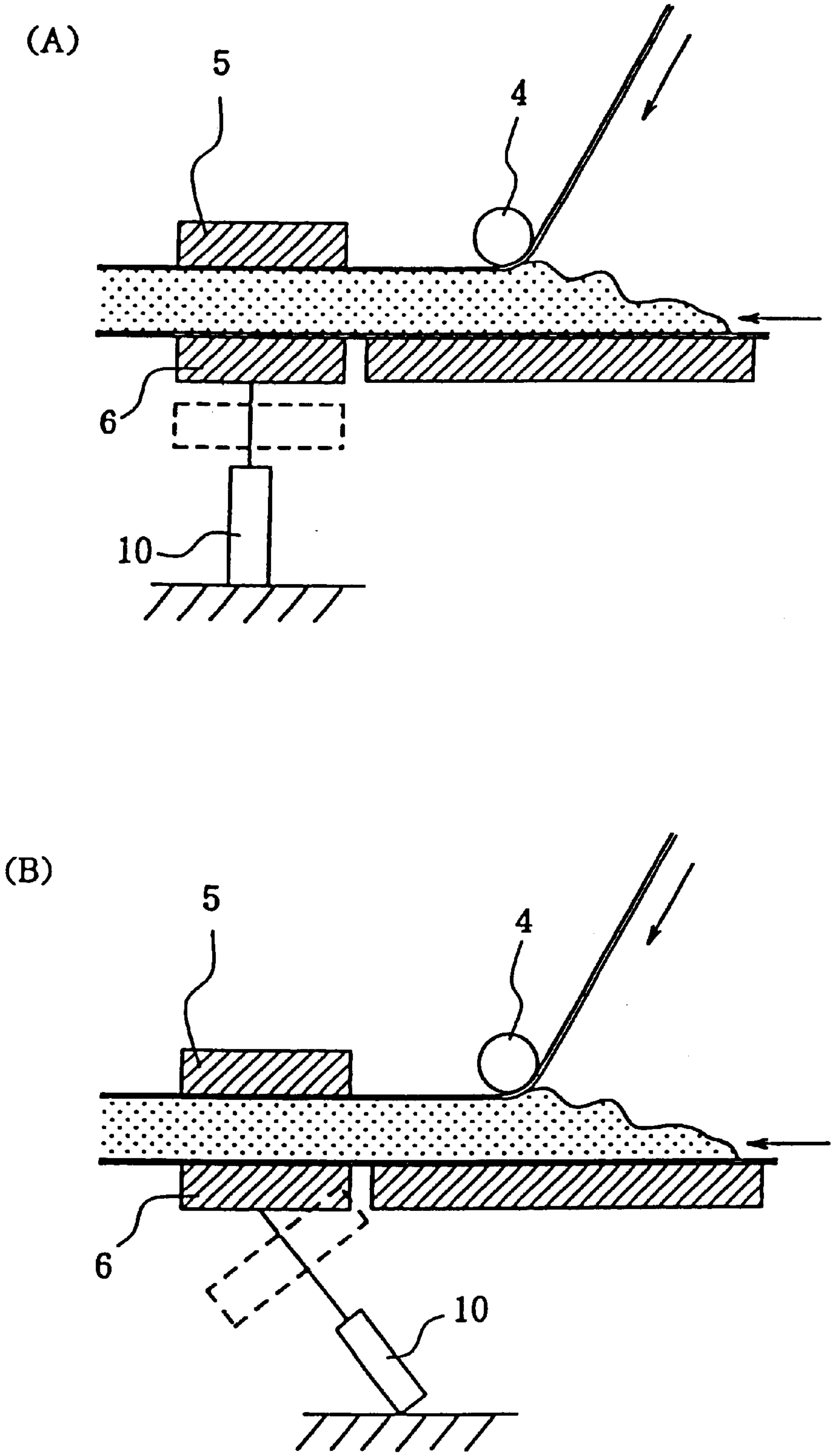
FIGS. 4A and 4B are schematic views showing vertical movability of a lower plate in a gypsum board production apparatus according to a still further embodiment of the present invention. Further.
Figure 5:
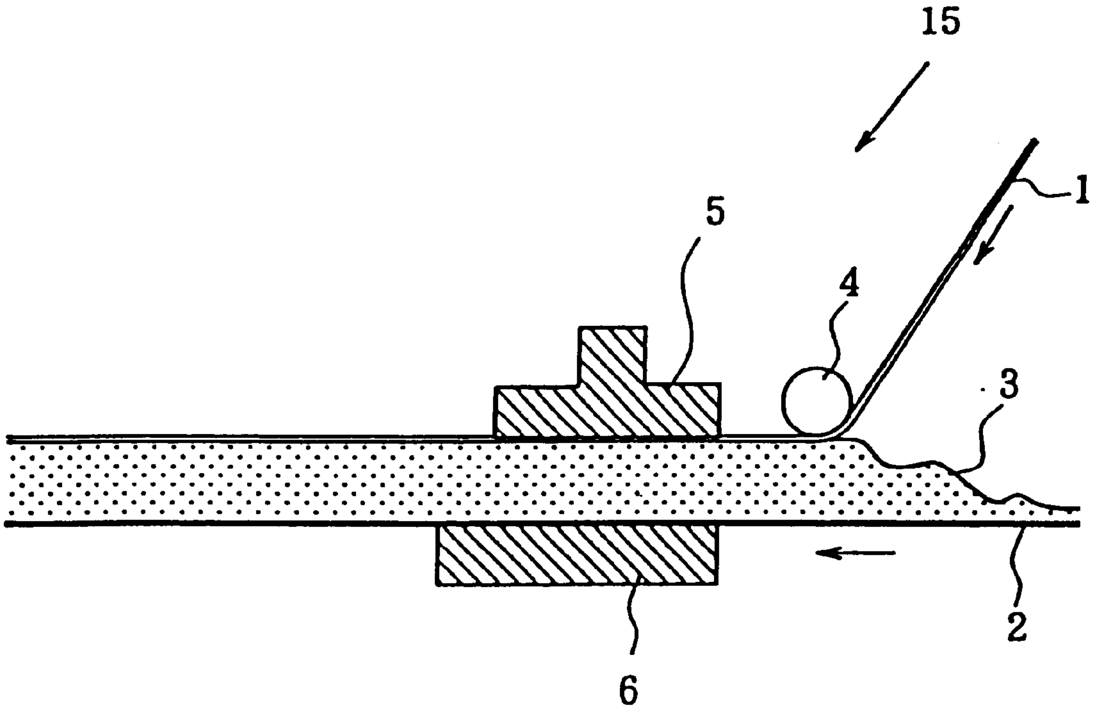
FIG. 5 is schematic view of a conventional gypsum board production apparatus.

The lower plate 6 is normally fixed. It may, however, be arranged movably in a vertical direction as shown in FIGS. 4A and 4B for widening the spacing from the upper plate 5 or for cleaning or other purposes. In FIG. 1, numeral 7 indicates an upper electrode arranged in sliding contact with the overlay paper 1, and numeral 8 designates a lower electrode arranged in sliding contact with the underlay paper 2. These electrodes may be in the form of rods, square bars or plates insofar as they can each be kept in even contact with the gypsum board over the entire width of the gypsum board.

As a mode for carrying out the measurement of a current in the present invention, electrodes may be arranged on the upper plate 5 and the lower plate 6, respectively, and a voltage may be applied between these electrodes. If both of the overlay paper 1 and the underlay paper 2 tear (break), a current is allowed to flow between the upper plate 5 and the lower plate 6 so that the tearing of the papers can be surely detected by the current detector 9. As an alternative, a circuit may be formed between an electrode arranged on the upper plate 5 and the upper electrode 7, and a voltage may be applied across the circuit. Tearing of the overlay paper 1 allows a current to flow between the upper plate 5 and the electrode 7 so that the tearing of the overlay paper can be surely detected. As a further alternative, a circuit may be formed between the lower plate 6 and the lower electrode 8, and an electrode maybe applied across the circuit. Tearing of the underlay paper 2 allows a current to flow between the lower plate 6 and the lower electrode 8 so that the tearing of the underlay paper can be surely detected by the current detector 9. To ensure occurrence of a flow of a current even at a very small difference in potential, the upper plate 5 and the lower plate 6 are both grounded as indicated by letter C. Designated at letter D are power supplies. The voltages applied in the above modes can be either alternating currents or direct currents.

A description will next be made about preferred embodiments of the present invention. In the gypsum board production apparatus shown in FIG. 1, an electrical circuit is formed between a part of the overlay paper 1, said part being located in the advancing direction of the production of gypsum boards as viewed from the upper plate 5, and the upper plate 5. Also arranged are the current detector 9, which detects a flow of a current through the electrical circuit, and a device which responsive to a detection signal from the current detector 9, widens the spacing between the upper plate 5 and the lower plate. In the gypsum board production apparatus according to the present invention, the green gypsum board continues to run between the upper plate 5 and the lower plate 6 as long as no abnormality arises during operation of the apparatus. During this time, a voltage is kept applied between the upper plate 5 and the upper electrode 7. The overlay paper 1 however acts as an insulator, so that no electrical circuit is formed through the upper plate 5, the upper electrode 7 and the current detector 9. If the overlay paper 1 tears, however, the gypsum slurry 3 is brought into contact with the upper plate 5 and also with the upper electrode 7. The gypsum slurry 3 is a mixed slurry of calcined gypsum and water and is a conductor of electricity. Accordingly, an electrical circuit is formed through the upper plate 5, the upper electrode 7 and the current detector 9. The formation of the electrical circuit is detected by the current detector 9, and based on a signal from the current detector 9, the air cylinder 10 is actuated such that the upper plate 5 is lifted to a position indicated by dotted lines.

When the spacing between the upper plate 5 and the lower plate 6 has been widened as described above, an undesired object which has been caught on the plates becomes possible to easily pass between the plates 5 and 6. As a result, the cause for the above-described flow of the current (tearing) is eliminated so that the underlay paper 1 and/or overlay paper 2 will no longer be torn. Although no limitation is imposed on the lifting speed of the upper plate 5, the faster the more desirable because the tearing of lining paper for gypsum boards can be made shorter as the lifting speed becomes faster. After the undesired object has passed between the upper plate 5 and the lower plate 6, the upper plate 5 is lowered to its original position. This makes it possible to continue the producing operation of gypsum boards without occurrence of defective products in a large quantity and also without needing stoppage of the operation.

Specific examples of a method for causing the upper plate 5 to return to its original position can include determining, from a production speed of gypsum boards, a time required for the torn paper to move from the upper plate 5 to the upper electrode 7 and setting a timer at this time to actuate the air cylinder 10 such that the upper plate 5 is caused to return to its original position; actuating, after visual confirmation of passage of the torn paper, the air cylinder 10 such that the upper plate 5 is caused to return to its original position; and counting, by a measure roll, the number of revolutions of a roll for a belt conveyor on which the green gypsum board is being conveyed subsequent to its formation and, after a count equivalent to the length of the torn paper has been made, actuating the air cylinder 10 such that the upper plate 5 is caused to return to its original position. Incidentally, the return of the upper plate 5 to its original position is gradually effected while controlling the air cylinder 10, because prompt lowering of the upper plate 5 back to its original position may result in flooding of the underlay paper 2 with the gypsum slurry 3 and/or tearing of the overlay paper 1.

Turning next to the lower plate 6 and the lower electrode 8, the upper plate 5 is also lifted to the position indicated by the dotted lines for a similar principle as in the case of the upper plate 5 and the upper electrode 7 when the underlay paper 2 tears. After an undesired object is allowed to pass between the plates 5 and 6 accordingly, the upper plate 5 is caused to return to its original position. In so far as "any one of the above-described methods is relied upon" with the upper plate 5, the upper electrode 7 the lower plate 6 and the lower electrode 8 are arranged as described above; no problem arises for the lifting of the upper plate 5 even when only one of the overlay paper 1 and the underlay paper 2 tears. If the overlay paper 1 and the underlay paper 2 tear at the same time, it is also possible to cope with the tearing by detecting a flow of a current between the upper plate 5 and the lower plate 6. Concerning the spacing between the upper plate 5 and the upper electrode 7 and that between the lower plate 6 and the lower electrode 8, the smaller the more preferred because the extent of paper tearing can be rendered smaller.

As the materials of the upper plate 5, the lower plate 6, the upper electrode 7 and the lower electrode 8, any materials can be used insofar as they are good conductors of electricity and have relatively high strength. Illustrative are iron, stainless steel, and carbon. As the overlay paper 1 and the underlay layer 2, those of 0.2 to 1.0 mm in thickness are generally employed, although no particular limitation is imposed on the thickness. Likewise, no particular limitation is imposed on the thickness of the gypsum rock core. In the present invention, it is desired to also cover the side surfaces of the gypsum rock core by the underlay paper 2. No particular limitation is imposed on the voltage applied to the upper plate 5, the lower plate 6, the upper electrode 7 and the lower electrode 8, insofar as it is such a low voltage that is not dangerous even if a worker contacts such a plate or electrode.

Example 2

Figure 2:
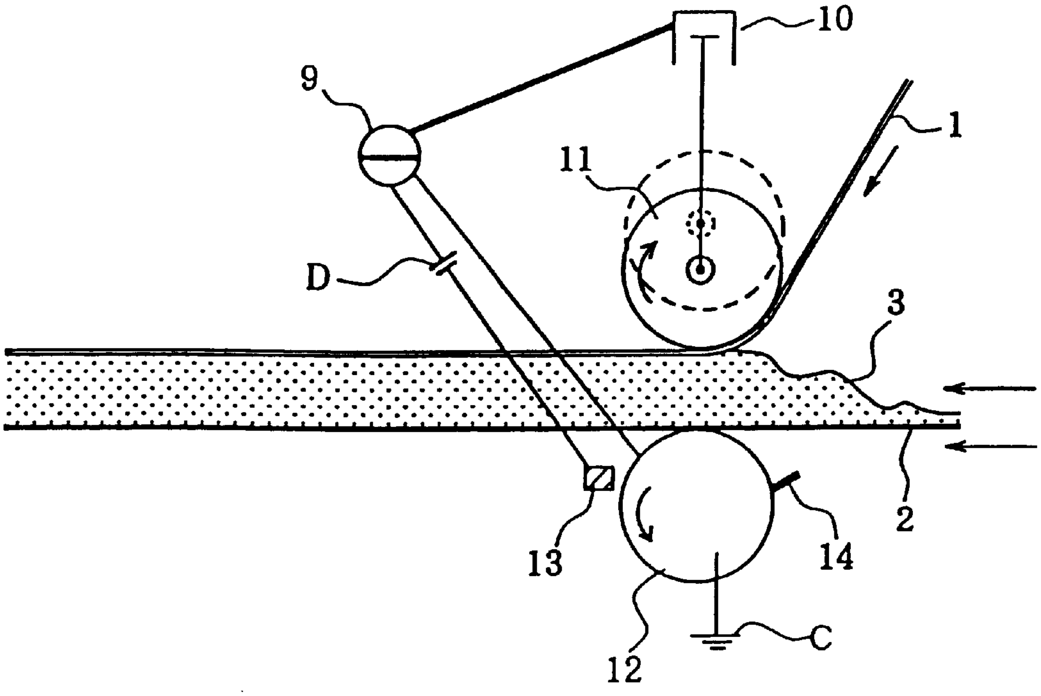
FIG. 2 and FIG. 3 are schematic diagrams of gypsum board production apparatuses according to other embodiments of the present invention.

Another embodiment of the present invention is illustrated in FIG. 2. An overlay paper 1 and an underlay paper 2 are travelling in a right-to-left direction as viewed in the diagram, and a gypsum slurry 3 is continuously fed onto the underlay paper 2. Between an electrode 13 and a lower forming roll 12, a small gap is left or insulation is maintained. If an undesired object is caught between an upper forming roll 11 and the lower forming roll 12 and the underlay paper 2 is torn, the gypsum slurry 3 flows on a surface of the lower forming roll 12 in the direction of rotation of the lower forming roll 12 so that the gap between the lower forming roll 12 and the electrode 3 is filled. An electric circuit is, therefore, formed between the lower forming roll 12 and the electrode 13. The formation of this electric circuit is detected by a current detector 9, and based on this detection, an air cylinder 10 is actuated such that the forming roll 11 is lifted to a position indicated by a dashed line. The diagram also illustrates a ground C and a power supply D. The gypsum slurry 3, which has adhered on the surface of the lower forming roll as a result of tearing of the underlay paper 2, is removed by a cleaning blade 14 made of iron or the like. In this example, production of defect-free gypsum boards can also be promptly resumed provided that the upper forming roll 11 is caused to return to its original position shortly after the passage of the undesired object.

When the lower forming unit is a plate, a similar effect can also be obtained if the gypsum board production apparatus is designed such that a gypsum slurry flowed out onto the lower plate is brought into contact with the electrode 13.

Example 3

Figure 3:
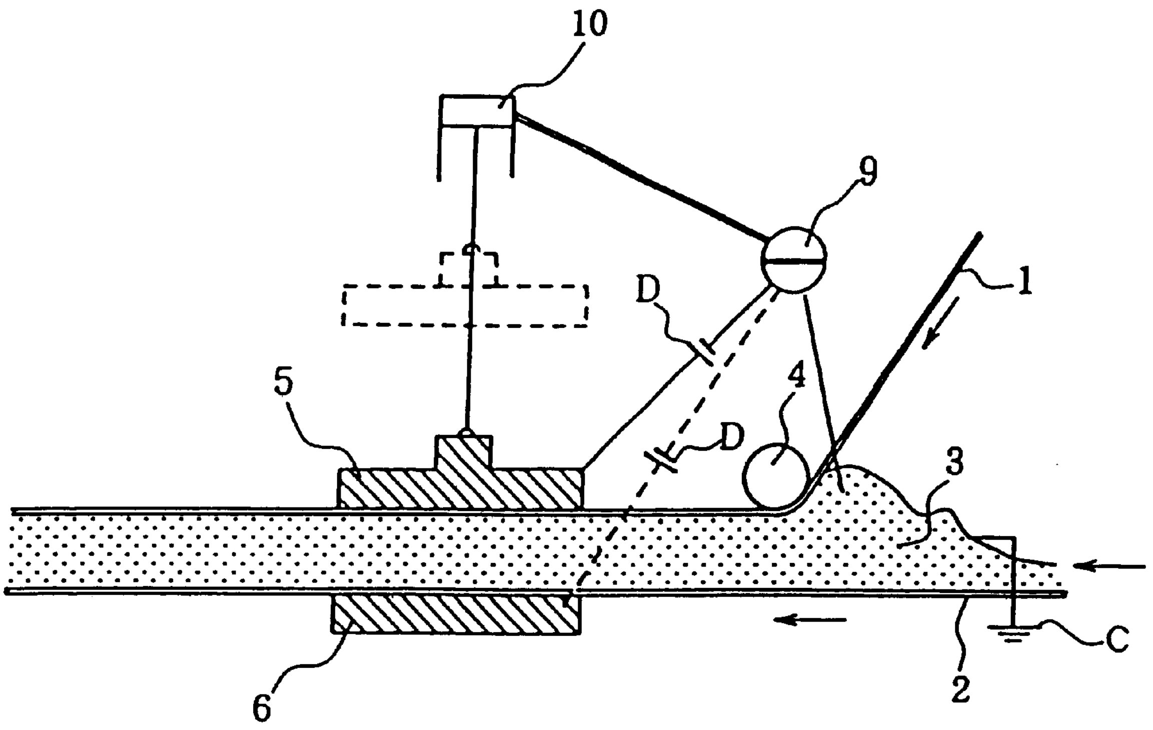

A further embodiment of the present invention is depicted in FIG. 3. In the diagram, an upper plate 5 and a lower plate 6 are independently insulated. A contact area between the upper plate 5 and an overlay paper 1 and a contact area between the lower plate 6 and an underlay paper 2 are insulated by the overlay paper 1 and the underlay paper 2, respectively. The diagram also illustrates a ground A and power supplies D.

An electric circuit is formed between the upper plate 5, and a gypsum slurry and, an ac or dc voltage is kept applied to the electric circuit through a current detector 9. Likewise, an electric circuit is formed between the lower plate 6 and the slip of gypsum 3 through the current detector 9. Now assume that an undesired object is caught between the plates 5 and 6 and the overlay paper 1 or the overlay paper 2 is torn. The insulation between the upper plate 5 or lower plate 6 and the gypsum slurry 3 then becomes no longer maintained, so that an electric circuit is formed through the gypsum slurry 3, the upper plate 5 and the current detector 9 or through the gypsum slurry 3, the lower plate 6 and the current detector 9.

By a signal from the current detector 9 which has detected the formation of this electric current, the air cylinder 10 is actuated such that the upper plate 5 is lifted to a position indicated by dashed lines. Subsequent to passage of the undesired object, the upper plate 5 is caused to return to its original position. As a result, a loss resulting from the occurrence of tearing of the overlay paper 1 and/or the underlay paper 2 can be efficiently limited to the minimum, thereby making it possible to conduct continuous production of gypsum boards with good yield.

CAPABILITY OF EXPLOITATION IN INDUSTRY

According to the process and apparatus of the present invention for the production of gypsum boards, the upper plate or the upper forming roll is promptly lifted to widen the spacing between the upper and lower plates, between the upper and lower forming rolls or between the upper forming roll and the lower plate, when during production of gypsum boards, an undesired object is caught between the upper and lower plates, between the upper and lower forming rolls or between the upper forming roll and the lower plate and the paper is torn. This allows the undesired object to easily pass, so that the tearing of the paper is prevented from spreading further. Further, the upper plate or the upper forming roll can be lowered to its original position after the passage of the undesired object. The operation for the production of gypsum boards can, therefore, be continued without needing to stop the operation. As a consequence, it is possible to minimize the occurrence of defective products, which arises from tearing of the overlay paper and/or the underlay paper, and a loss resulting from the stoppage of the producing operation and hence to efficiently conduct continuous production of gypsum boards with good yield.

What is claimed is:

1. A process for producing gypsum board by holding a gypsum slurry at upper and lower surfaces thereof with an overlay paper and an underlay paper, respectively, and then causing a resulting perform to travel between and lower forming units, which are composed in combination of plated and/or forming rolls as an upper forming unit and a lower forming unit, while pressing said preform with said upper forming unit, which comprises: forming an electric circuit at least one of between said upper forming unit and said lower forming unit, between a part of said overlay paper, said part being located in an advancing direction of said production of said gypsum boards as viewed from said upper forming unit, and said upper forming unit, and between a part of said underlay paper, said part being located in said advancing direction of said production of said gypsum boards as viewed from said lower forming unit, and said lower forming unit, applying a voltage across said electric circuit, widening a spacing between said upper forming unit and said lower forming unit when a current has flowed through said electric circuit during production of said gypsum boards, and subsequent to elimination of a cause for said flow of said current, narrowing said widened spacing back to said spacing before said widening.

2. A process according to claim 1, wherein said spacing between said upper forming unit and said lower forming unit is widened by lifting said upper forming unit, and said lifted upper forming unit is lowered to its original position.

3. A process for producing gypsum boards by holding a gypsum slurry at upper and lower surfaces thereof with an overlay paper and an underlay paper, respectively, and then causing a resulting preform to travel between an upper forming roll and a lower forming roll or between an upper forming roll or a lower plate while pressing said preform with said upper forming roll, which comprises: forming at least one electric circuit between said upper forming roll or said lower forming roll and an electrode arranged with a space relative to said lower forming roll or said lower plate, applying a voltage across said electric circuit, widening a spacing between said upper forming roll and said lower forming roll or said lower plate when a current has flowed through said electric circuit during production of said gypsum boards, and subsequent to elimination of a cause for said flow of said current, narrowing said widened spacing back to said spacing before said widening.

4. A process according to claim 3, wherein said spacing between said upper forming roll and said lower forming roll or said lower plate is widened by lifting said upper forming roll, and said lifted upper forming roll is then lowered to its original position.

5. An apparatus for producing gypsum boards by holding a gypsum slurry at upper and lower surfaces thereof with an overlay paper and an underlay paper, respectively, and then causing a resulting preform to travel between upper and lower forming units, which are composed in combination of plates and/or forming rolls as an upper forming unit and a lower forming unit, while pressing said preform with said upper forming unit, which comprises: an electric circuit formed at least one of between said upper forming unit and said lower forming unit, between a part of said overlay paper, said part being located in an advancing direction of said production of said gypsum boards as viewed from said forming unit, and said upper forming unit, and between a part of said underlay paper, said part being located in said advancing direction of said production of said gypsum boards as viewed from said lower forming unit, and said lower forming unit; a current detector for detecting flowing of a current through said electric circuit and outputting a detection signal; and a device for widening, responsive to said detection signal, a spacing between said upper forming unit and said lower forming unit and after an elapse of a predetermined time, narrowing said widened spacing back to said spacing before said widening.

6. An apparatus according to claim 5, wherein said device is constructed such that said spacing between said upper forming unit and said lower forming unit is widened by lifting said upper forming unit, and said lifted upper forming unit is then lowered to its original position.

* * * * *